April 19, 1949. N. A. CHRISTENSEN 2,467,370
PRESSURE SEAL
Original Filed April 15, 1943
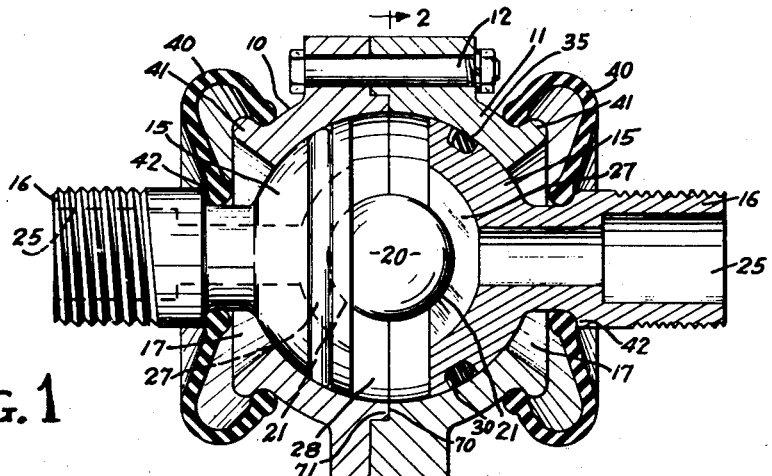
FIG. 1
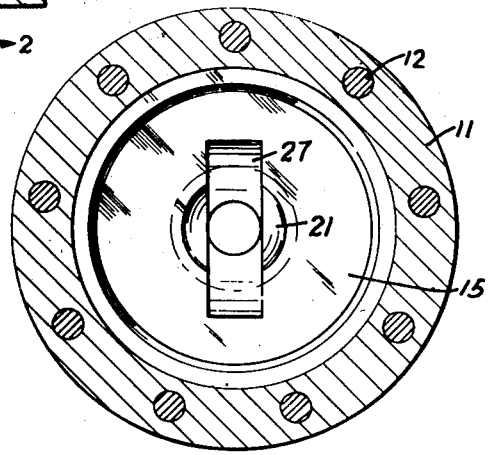
FIG. 2
FIG. 4
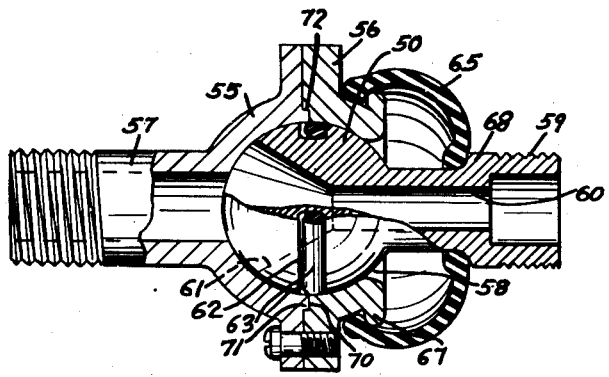
FIG. 5
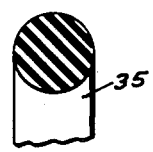
FIG. 3
INVENTOR.
NIELS A CHRISTENSEN
BY Bates, Teare & McBean.
ATTORNEYS Patented Apr. 19, 1949

2,467,370

UNITED STATES PATENT OFFICE 2,467,370

PRESSURE SEAL

Niels A. Christensen, South Euclid, Ohio

Original application April 15, 1943, Serial No. 483,165. Divided and this application November 13, 1945, Serial No. 628,250

5 Claims. (Cl. 285—94)

1

This invention relates to an improvement in packing devices and particularly to an improved pressure seal which prevents the escape of fluid under pressure between the coacting surfaces of two relatively movable members. The present application constitutes a division of my application for Letters Patent Serial No. 483,165, filed April 15, 1943, now Patent No. 2,394,364.

An object of the present invention is the provision of a pressure seal in a universal joint, particularly where applied to a universal pipe coupling, that is used for connecting together conduits which carry fluid under pressure.

In the drawings, Fig. 1 is a longitudinal sectional view illustrating the invention in connection with a ball and socket joint for fluid conduits; Fig. 2 is a transverse section taken on a plane indicated by the line 2—2 in Fig. 1; Fig. 3 is a fragmentary sectional view on an enlarged scale of a packing ring used in connection with the present invention; Fig. 4 is a diagrammatic illustration of the packing ring illustrated in Fig. 3 when assembled in the coupling, and Fig. 5 is a modified form of universal joint structure.

The invention is applied to a universal joint between two conduits and, as is illustrated in Figs. 1 to 4 inclusive, comprises two socket members 10 and 11 which are held together by suitable bolts 12. Each section houses a segmental ball member 15 which is provided with a hollow extension 16 that projects outwardly through an opening 17 in the socket of the associated section. Each opening is of sufficient size to permit a certain amount of relative universal rotation between the socket and its associated ball segment. The ball segments are retained in spaced relationship by a sphere 20 which rests in seats 21 formed in the respective ball segments.

A fluid passageway 25 in each extension or nipple 16 extends through the interior of each ball segment and communicates with an arcuately and axially extending slot 27 which in turn communicates with the space 28 between the two segments. Each ball segment is provided with an annular groove 30 for the reception of a packing ring 35. The packing rings are preferably made of solid rubber-like material of synthetic composition which is very dense and yet possessive of great liveliness and elasticity. Each ring is normally circular in shape and, prior to assembly, is also circular in cross section, as indicated in Fig. 3. The outer diameter of the ring is slightly larger than the diameter of the circular portion of the socket with which the packing is intended to engage, whereby when the ring is assembled

2 within the associated groove 30, it will be compressed into a substantially ellipsoidal shape as is diagrammatically illustrated in Fig. 4.

Each annular groove 30 is wider than the major axis of the compressed ring, as a result of which the packing will move slightly within the groove in accordance with variations in difference of pressure between the interior and exterior portions of the coupling, and such movement kneads or works the material of the ring, thus keeping it alive and pliable and eliminating scuffing which would otherwise be caused by the static sliding of a totally confined resilient material along the surface of the confining member.

To protect the relatively movable surfaces of the coupling against the entrance of dust or other foreign material, I have shown dust shields 40 which embrace shouldered portions 41 on the socket members and engage behind shoulders 42 on the extensions 16. The shields are made of rubber-like material so as to retain a snug engagement with the respective moving parts of the joint, and yet permit freedom of movement within the permissible range for which the joint parts are designed.

In Fig. 5 I have shown a modified form of universal joint which utilizes only one ball member 50. In this form of construction the spherical socket is formed by two members 55 and 56, the member 55 being provided with a threaded boss-like hollow extension 57 to which a conduit may be secured, and the member 56 having an opening 58 through which a nipple-like extension 59 of the ball member projects. The extension 59 is provided with an axially extending bore 60, the end of which is enlarged, as at 61, for communication with the passageway within the extension 57, thus allowing for an unobstructed flow of fluid through the joints while at the same time permitting the swinging of the ball within the socket. The ball 50 is provided with an annular recess 62 in which is mounted a packing ring 63, the ring and recess having substantially the same relationship as that heretofore described between the ring 35 and the associated groove 30 in connection with Figs. 1 to 4 inclusive. A dust shield 65 of rubber-like material is adapted to embrace the section 66 behind a shoulder 67, and to engage against a shoulder 68 on the extension 59 to prevent the accumulation of any dirt on the exposed surfaces adjacent the relatively movable portions of the coupling.

In units of the type shown in the present application, gaskets may or may not be used between two halves of the sockets. Ordinarily a ground joint is preferred to a gasket, because the former assures a more perfect fit between the surfaces of the ball and the socket, thus decreasing the tendency for fluid to escape between the surfaces. One form of construction employed, however, includes a recess, such as that indicated at 70, in one of the socket members into which a lip 71 on the face of the other member projects, thus resulting in the formation of an axial shoulder 72.

An advantage of a fluid coupling made according to the present invention is the fact that the joint is effectively sealed without the need for a packing gland and screw threaded couplings which usually depend upon friction for obtaining a leak-proof joint. The present invention allows the coupling members to be moved readily with reference to each other, and by virtue of the relationship between the packing ring and groove, a leak-proof joint is readily maintained under all positions of the joint within the range of limit of movement thereof.

I claim:

1. A universal coupling for a fluid pressure conduit, comprising a two-part socket member, each part being provided with axially aligned openings and forming an internal spherical socket, a segmental ball mounted in each socket member, said ball having shaft-like portions each extending through the opening in its respective socket and having a fluid conduit passageway extending therethrough, a relatively small sphere disposed between two segments to maintain them spaced apart and in contact with the walls of the socket, and means providing a channel in each segment for the admission of fluid through the shaft thereof into the space between the two segments, communicating with an arcuate channel about said relatively small sphere, each segment having an annular recess in its periphery, a packing ring in each recess, each recess being wider than its respective packing ring, whereby each packing ring will roll in the recess consequent upon relative movement between its segment and the housing.

2. A universal coupling for a fluid pressure conduit, including a socket member having axially aligned openings therein, a member with a spherical surface disposed within said socket member and having a conduit extension thereon projecting through one of said openings, one of said members having an annular groove therein with a bottom and side walls, said bottom being concentric with said spherical surface, a ring packing in said groove, said ring having a larger diameter than the depth of the groove, whereby the ring is deformed when positioned in said groove and when the ball is disposed within said socket member, and said groove having a width larger than the maximum cross-sectional dimension of the deformed ring to permit movement of the ring within the groove consequent upon relative movement between the ball and socket members.

3. A universal coupling for a fluid pressure conduit, comprising a socket member, a ball member disposed within the socket member and having an extension thereon projecting from one end of the socket member, the ball member having an annular groove therein with a bottom and side walls, said bottom being concentric with the spherical surface of the ball member, a ring packing disposed within the groove and operating to effect a seal between the ball and socket member, said packing ring being adapted to be deformed under pressure and having a cross-sectional circular shape prior to deformation, the normal cross-sectional diameter of the packing ring being larger than the depth of the groove, whereby the ring is deformed to substantially elliptical shape when positioned within the groove and when the ball is disposed within the socket member, said groove having a width larger than the maximum cross-sectional dimension of the deformed ring to permit rolling movement of the ring in the groove consequent upon relative movement between the ball and socket members.

4. A universal coupling for a fluid pressure conduit, comprising a two-part socket member, each part being provided with axially aligned openings and forming an internal spherical socket, a segmental ball member mounted in each socket member, each ball member having a shaft-like portion extending through the opening in its respective socket member and having a fluid conduit passageway extending therethrough, means disposed between said ball members to maintain them in spaced relationship and in contact with the walls of the socket members, at least one of the coacting ball and segment members having an annular recess in its periphery, the bottom of said recess being concentric with the surface of said member, a packing ring in said recess, said recess being wider than the packing ring, whereby the ring will roll in the recess consequent upon relative movement between the ball and socket members.

5. A universal joint for connecting two tubular conduits comprising a pair of hollow members each having an interior surface which is a zone of a sphere terminating at a diametric plane, the two members having external annular flanges abutting each other in said plane, means for securing the flanges together, each of the members having a central opening, a ball member retained within the socket provided by the two members and having a tubular shank extending through the opening of one of the members, the exterior surface of the ball member and the interior surface of the socket members being concentrically spherical on substantially the same radius and one of such members having an annular groove of greater cross-sectional width than its depth, and a toroidal elastic ring occupying said groove and compressed against the opposite member, said ball member having a conduit within it leading from the tubular shank to the opposite side of the ball member, and tubular means communicating with said conduit.

NIELS A. CHRISTENSEN.

REFERENCES CITED

The following references are of record in the file of this patent:

UNITED STATES PATENTS

| Number | Name | Date |
|---|---|---|
| 122,614 | Kearney | Jan. 9, 1872 |
| 386,547 | Martin | July 24, 1888 |
| 397,981 | Haggett | Feb. 19, 1889 |
| 910,687 | Jenkins | Jan. 26, 1909 |
| 1,263,777 | Langton et al. | Apr. 23, 1918 |
| 1,563,161 | Christenson | Nov. 24, 1925 |
| 1,906,575 | Goeriz | May 2, 1933 |
| 1,959,259 | Zerk | May 15, 1934 |
| 2,370,964 | Janette | Mar. 6, 1945 |

FOREIGN PATENTS

| Number | Country | Date |
|---|---|---|
| 12,857 | Great Britain | June 3, 1907 |
| 484,838 | Great Britain | May 11, 1938 |
| 123,510 | Germany | Sept. 12, 1901 |